(12) United States Patent
Liu et al.

(10) Patent No.: US 12,039,772 B2
(45) Date of Patent: Jul. 16, 2024

(54) PROCESSING SYSTEM, ESTIMATION APPARATUS, PROCESSING METHOD, AND NON-TRANSITORY STORAGE MEDIUM

(71) Applicant: NEC Corporation, Tokyo (JP)

(72) Inventors: Jianquan Liu, Tokyo (JP); Junnan Li, Tokyo (JP)

(73) Assignee: NEC CORPORATION, Tokyo (JP)

( * ) Notice: Subject to any disclaimer, the term of this patent is extended or adjusted under 35 U.S.C. 154(b) by 469 days.

(21) Appl. No.: 17/600,711

(22) PCT Filed: Apr. 5, 2019

(86) PCT No.: PCT/JP2019/015210
§ 371 (c)(1),
(2) Date: Oct. 1, 2021

(87) PCT Pub. No.: WO2020/202572
PCT Pub. Date: Oct. 8, 2020

(65) Prior Publication Data
US 2022/0189151 A1    Jun. 16, 2022

(51) Int. Cl.
*G06T 7/70* (2017.01)
*G06V 10/774* (2022.01)

(52) U.S. Cl.
CPC ............ *G06V 10/7747* (2022.01); *G06T 7/70* (2017.01); *G06T 2207/20081* (2013.01)

(58) Field of Classification Search
CPC ............ G06V 10/7747; G06V 10/147; G06V 10/243; G06V 10/82; G06T 7/70; G06T 2207/20081; G06T 5/60; G06T 5/80
USPC ........................................................ 382/159
See application file for complete search history.

(56) References Cited

U.S. PATENT DOCUMENTS

| 2017/0364826 A1 | 12/2017 | Mitarai |
| 2018/0005069 A1 | 1/2018 | Shibata et al. |
| 2018/0005089 A1 | 1/2018 | Pham |

FOREIGN PATENT DOCUMENTS

| JP | 2000-048187 A | 2/2000 |
| JP | 2017-224156 A | 12/2017 |
| JP | 2018-005357 A | 1/2018 |
| JP | 2018-005405 A | 1/2018 |

(Continued)

OTHER PUBLICATIONS

International Search Report for PCT Application No. PCT/JP2019/015210, mailed on Jul. 9, 2019.

*Primary Examiner* — Stephen P Coleman
(74) *Attorney, Agent, or Firm* — Sughrue Mion, PLLC (57) ABSTRACT

The present invention provides a processing system (10) including: a sample image generation unit (11) that generates a plurality of sample images being each associated with a partial region of a first image generated using a first lens; an estimation unit (12) that generates an image content estimation result indicating a content for each of the sample images using an estimation model generated by machine learning using a second image generated using a second lens differing from the first lens; a task execution unit (14) that estimates a relative positional relationship of a plurality of the sample images in the first image; a determination unit (15) that determines whether an estimation result of the relative positional relationship is correct; and a correction unit (16) that corrects a value of a parameter of the estimation model when the estimation result of the relative positional relationship is determined to be incorrect.

8 Claims, 10 Drawing Sheets

(56) References Cited

FOREIGN PATENT DOCUMENTS

| | | |
|---|---|---|
| JP | 2018-524678 A | 8/2018 |
| JP | 2019-500687 A | 1/2019 |

PROCESSING SYSTEM, ESTIMATION APPARATUS, PROCESSING METHOD, AND NON-TRANSITORY STORAGE MEDIUM

This application is a National Stage Entry of PCT/JP2019/015210 filed on Apr. 5, 2019, the contents of all of which are incorporated herein by reference, in their entirety.

TECHNICAL FIELD

The present invention relates to a processing system, an estimation apparatus, a processing method, and a program.

BACKGROUND ART

Patent Document 1 discloses a technique for performing machine learning with a training image and information identifying a business store position. Then, Patent Document 1 discloses that a panoramic image, an image having a visual field larger than 180°, a spherical or substantially spherical panoramic image, and the like can serve as a training image.

RELATED DOCUMENT

Patent Document

[Patent Document 1] Japanese Patent Application Publication (Translation of PCT Application) No. 2018-524678

DISCLOSURE OF THE INVENTION

Technical Problem

When captured with lenses differing in characteristic (field angle, and the like), even the same subject may differ in feature appearing in an image. For example, a feature of a subject appearing in an image may differ between a case of capture with a fish-eye lens having a wide field angle that may cause distortion of an image, and a case of capture with what is called a standard lens having a field angle of around 40° to 60°.

In recent years, it has been a practice to estimate a content of an image by use of an estimation model generated by machine learning. Although a large amount of learning data is needed in order to generate an estimation model having sufficient estimation accuracy, preparing a large amount of learning data (a combination of an image generated by capture using each lens and a label indicating a content of the image) for each of lenses differing in characteristic is troublesome. An object of the present invention is to provide a new method for generating an estimation model for estimating a content of an image.

Solution to Problem

The present invention provides a processing system including:
a sample image generation means for generating, from a first image for learning generated by capture using a first lens, a plurality of sample images being each associated with a partial region of the first image for learning;
an estimation means for inputting the sample image into an estimation model generated by machine learning using learning data including a second image generated by capture using a second lens differing in characteristic from the first lens and a label indicating a content of the second image, and generating an image content estimation result indicating a content for each of the sample images;
a task execution means for estimating, based on the image content estimation result for each of the sample images, a relative positional relationship of a plurality of the sample images in the first image for learning;
a determination means for determining whether an estimation result of the relative positional relationship is correct; and
a correction means for correcting a value of a parameter of the estimation model when an estimation result of the relative positional relationship is determined to be incorrect.

Moreover, according to the present invention,
a processing system including a transfer learning means for applying, by transfer learning using learning data including a fish-eye lens image generated by capture using a fish-eye lens and a label indicating a content of the fish-eye lens image, an estimation model for estimating a content of a panoramic image resulting from plane development of the fish-eye lens image, to a region for estimating a content of the fish-eye lens image.

Moreover, the present invention provides
an estimation apparatus that estimates a content of an image of an estimation target generated by capture using a first lens, or an image resulting from plane development of the image of the estimation target, by use of an estimation model in which a value of a parameter is adjusted by a processing system including
a sample image generation means for generating, from a first image for learning generated by capture using the first lens, a plurality of sample images being each associated with a partial region of the first image for learning,
an estimation means for inputting the sample image into the estimation model generated by machine learning using learning data including a second image generated by capture using a second lens differing in characteristic from the first lens and a label indicating a content of the second image, and generating an image content estimation result indicating a content for each of the sample images,
a task execution means for estimating, based on the image content estimation result for each of the sample images, a relative positional relationship of a plurality of the sample images in the first image for learning,
a determination means for determining whether an estimation result of the relative positional relationship is correct, and
a correction means for correcting a value of a parameter of the estimation model when an estimation result of the relative positional relationship is determined to be incorrect.

Moreover, the present invention provides a processing method including:
by a computer,
generating, from a first image for learning generated by capture using a first lens, a plurality of sample images being each associated with a partial region of the first image for learning;
inputting the sample image into an estimation model generated by machine learning using learning data including a second image generated by capture using a second lens differing in characteristic from the first lens and a label indicating a content of the second image, and generating an image content estimation result indicating a content for each of the sample images;

estimating, based on the image content estimation result for each of the sample images, a relative positional relationship of a plurality of the sample images in the first image for learning;

determining whether an estimation result of the relative positional relationship is correct; and correcting a value of a parameter of the estimation model when an estimation result of the relative positional relationship is determined to be incorrect.

Moreover, the present invention provides a program that causes a computer to function as:

a sample image generation means for generating, from a first image for learning generated by capture using a first lens, a plurality of sample images being each associated with a partial region of the first image for learning;

an estimation means for inputting the sample image into an estimation model generated by machine learning using learning data including a second image generated by capture using a second lens differing in characteristic from the first lens and a label indicating a content of the second image, and generating an image content estimation result indicating a content for each of the sample images;

a task execution means for estimating, based on the image content estimation result for each of the sample images, a relative positional relationship of a plurality of the sample images in the first image for learning;

a determination means for determining whether an estimation result of the relative positional relationship is correct; and a correction means for correcting a value of a parameter of the estimation model when an estimation result of the relative positional relationship is determined to be incorrect.

Advantageous Effects of Invention

The present invention achieves a new method for generating an estimation model for estimating a content of an image.

BRIEF DESCRIPTION OF THE DRAWINGS

The above-described object, the other objects, features, and advantages will become more apparent from a suitable example embodiment described below and the following accompanying drawings.

DESCRIPTION OF EMBODIMENT

First Example Embodiment

First, an outline of a processing system according to the present example embodiment is described. The processing system corrects a value of a parameter of an estimation model adjusted in such a way that a content of a normal image generated by capture using a standard lens (e.g., having a field angle of about 40° to about 60°) can be accurately estimated, based on a result of a predetermined task using a panoramic image resulting from plane development of a fish-eye lens image generated by capture using a fish-eye lens (e.g., having a field angle of about) 180°, and the estimation model, and thereby adjusts a value of a parameter of the estimation model in such a way that a content of the panoramic image resulting from plane development of the fish-eye lens image can be accurately estimated.

Figure 1:
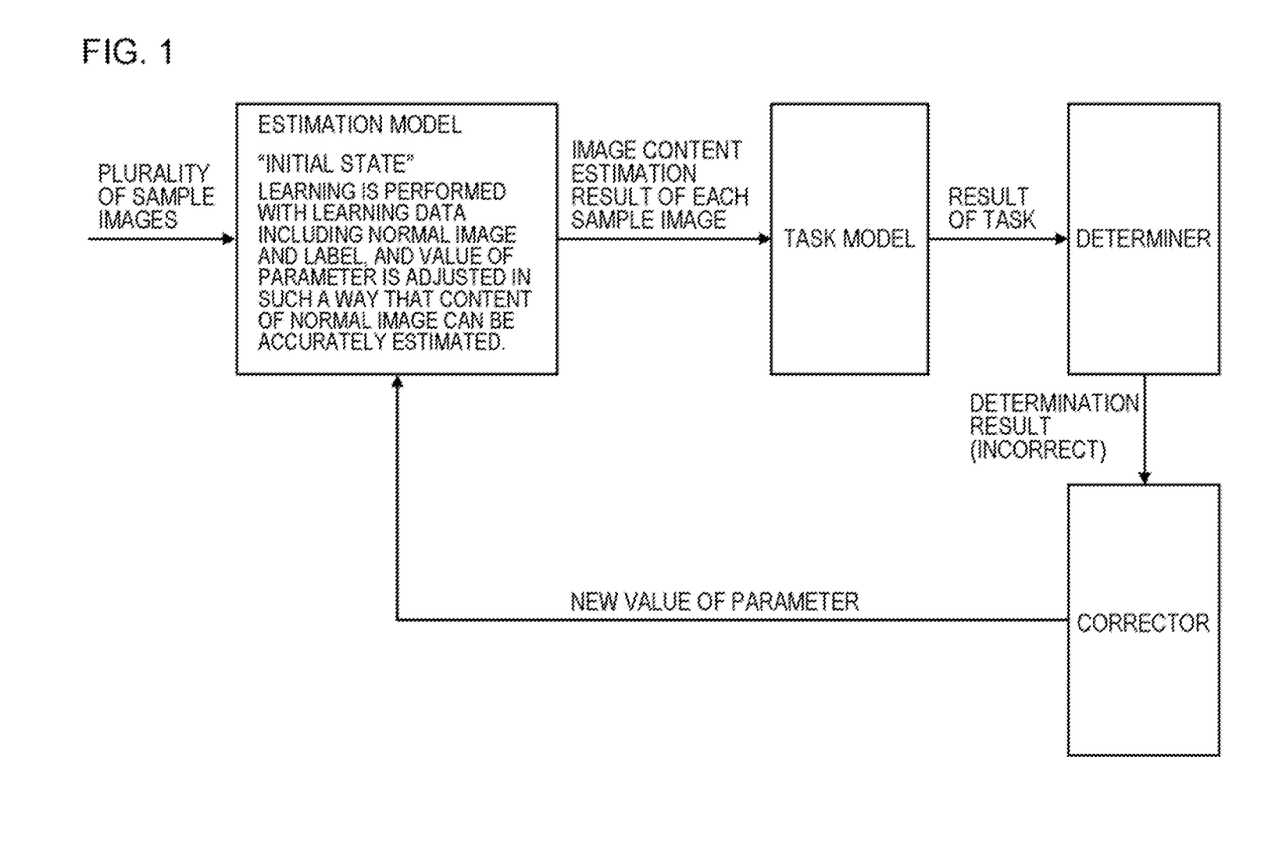
FIG. 1 is a diagram illustrating a concept of processing of a processing system according to the present example embodiment.

FIG. 1 illustrates an outline of the processing. First, an estimation model is prepared in which machine learning using learning data including a normal image and a label indicating a content of the normal image is already executed, and in which a value of a parameter is adjusted in such a way that a content of the normal image can be accurately estimated. In an initial state, the estimation model can accurately estimate an object, a place, a scene, a situation, and the like indicated by the normal image.

The processing system inputs a plurality of sample images generated from a panoramic image resulting from plane development of a fish-eye lens image into the estimation model, and acquires an estimation result (an image content estimation result) of a content of each sample image output from the estimation model. As described above, in an initial state, a value of a parameter of the estimation model is adjusted in such a way that a content of a normal image can be accurately estimated. Although repetition of an illustrated cycle allows a content of a panoramic image resulting from plane development of a fish-eye lens image to be accurately estimated, a possibility that an estimation result output from the estimation model is "incorrect" becomes high at an initial stage of the cycle.

"An estimation result is incorrect" indicates a state where a content indicated by an image does not coincide with a content indicated by an estimation result. On the other hand, "an estimation result is correct" indicates a state where a content indicated by an image coincides with a content indicated by an estimation result.

Thereafter, the processing system inputs the image content estimation result of each sample image into a task model, and acquires a result of a task output from the task model. When the image content estimation result of each sample image output from the estimation model is "correct", it becomes easy for a result of a task by the task model to satisfy a predetermined condition. On the other hand, when the image content estimation result of each sample image output from the estimation model is "incorrect", it becomes difficult for a result of a task by the task model to satisfy the predetermined condition.

Thereafter, the processing system inputs a result of a task into a determiner, and acquires a determination result output from the determiner. The determiner determines whether the result of the task satisfies a predetermined condition.

Then, when a determination result of the determiner is "the result of the task does not satisfy the predetermined condition", the processing system inputs the fact into a corrector. The corrector corrects the value of the parameter of the estimation model (updates to a new value of the parameter).

The processing system iterates the cycle until a determination result by the determiner satisfies a predetermined end condition.

Note that, in the present description, "acquisition" may include "fetching, by a local apparatus, data stored in another apparatus or a storage medium (active acquisition)", for example, receiving by requesting or inquiring of the another apparatus, accessing the another apparatus or the storage medium and reading, and the like, based on a user input, or based on an instruction of a program. Moreover, "acquisition" may include "inputting, into a local apparatus, data output from another apparatus (passive acquisition)", for example, receiving data given by distribution (or transmission, push notification, or the like), based on a user input, or based on an instruction of a program. Moreover, "acquisition" may include selecting and acquiring from received data or information, and "generating new data by editing of data (conversion into text, rearrangement of data, extraction of partial data, a change of a file format, or the like) or the like, and acquiring the new data".

Next, a configuration of the processing system is described in detail. First, one example of a hardware configuration of the processing system is described. Each functional unit included in the processing system is achieved by any combination of hardware and software, including a central processing unit (CPU) of any computer, a memory, a program loaded on the memory, a storage unit (that can store not only a program previously stored from a phase of shipping an apparatus, but also a program downloaded from a storage medium such as a compact disc (CD), a server on the Internet, or the like) such as a hard disk storing the program, and an interface for network connection. It is appreciated by a person skilled in the art that there are a variety of modification examples of methods and apparatuses for the achievement.

Figure 2:
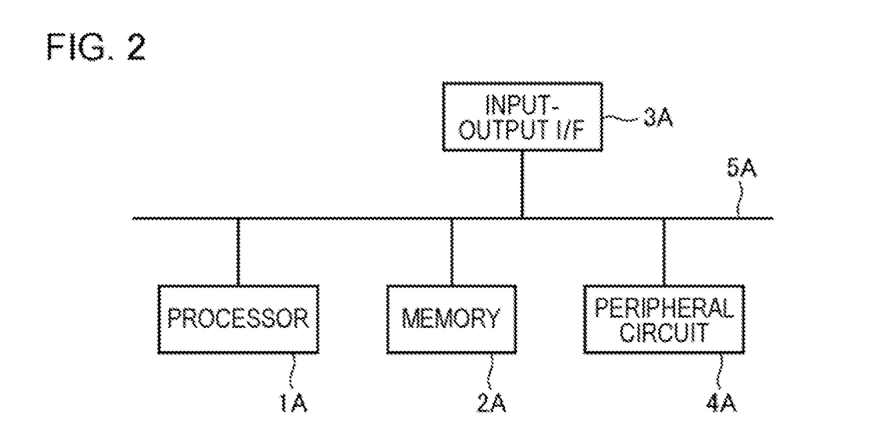
FIG. 2 is a diagram illustrating one example of a hardware configuration of the processing system and an estimation apparatus according to the present example embodiment.

FIG. 2 is a block diagram illustrating a hardware configuration of the processing system. As illustrated in FIG. 2, the processing system includes a processor 1A, a memory 2A, an input-output interface 3A, a peripheral circuit 4A, and a bus 5A. The peripheral circuit 4A includes various modules. The processing system may not include the peripheral circuit 4A. Note that, the processing system may be configured by a plurality of physically and/or logically separated apparatuses, or may be configured by one physically and/or logically integrated apparatus. When the processing system is configured by a plurality of physically and/or logically separated apparatuses, each of the plurality of apparatuses can be equipped with the above-described hardware configuration.

The bus 5A is a data transmission path through which the processor 1A, the memory 2A, the peripheral circuit 4A, and the input-output interface 3A mutually transmit and receive data. The processor 1A is, for example, an arithmetic processing apparatus such as a CPU or a graphics processing unit (GPU). The memory 2A is a memory such as a random access memory (RAM) or a read only memory (ROM). The input-output interface 3A includes an interface for acquiring information from an input apparatus, an external apparatus, an external server, an external sensor, a camera, or the like, an interface for outputting information to an output apparatus, an external apparatus, an external server, or the like, and the like. The input apparatus is, for example, a keyboard, a mouse, a microphone, a physical button, a touch panel, and the like. The output apparatus is, for example, a display, a speaker, a printer, a mailer, and the like. The processor 1A can give an instruction to each module, and perform an arithmetic operation, based on an arithmetic result of each of the modules.

Figure 3:
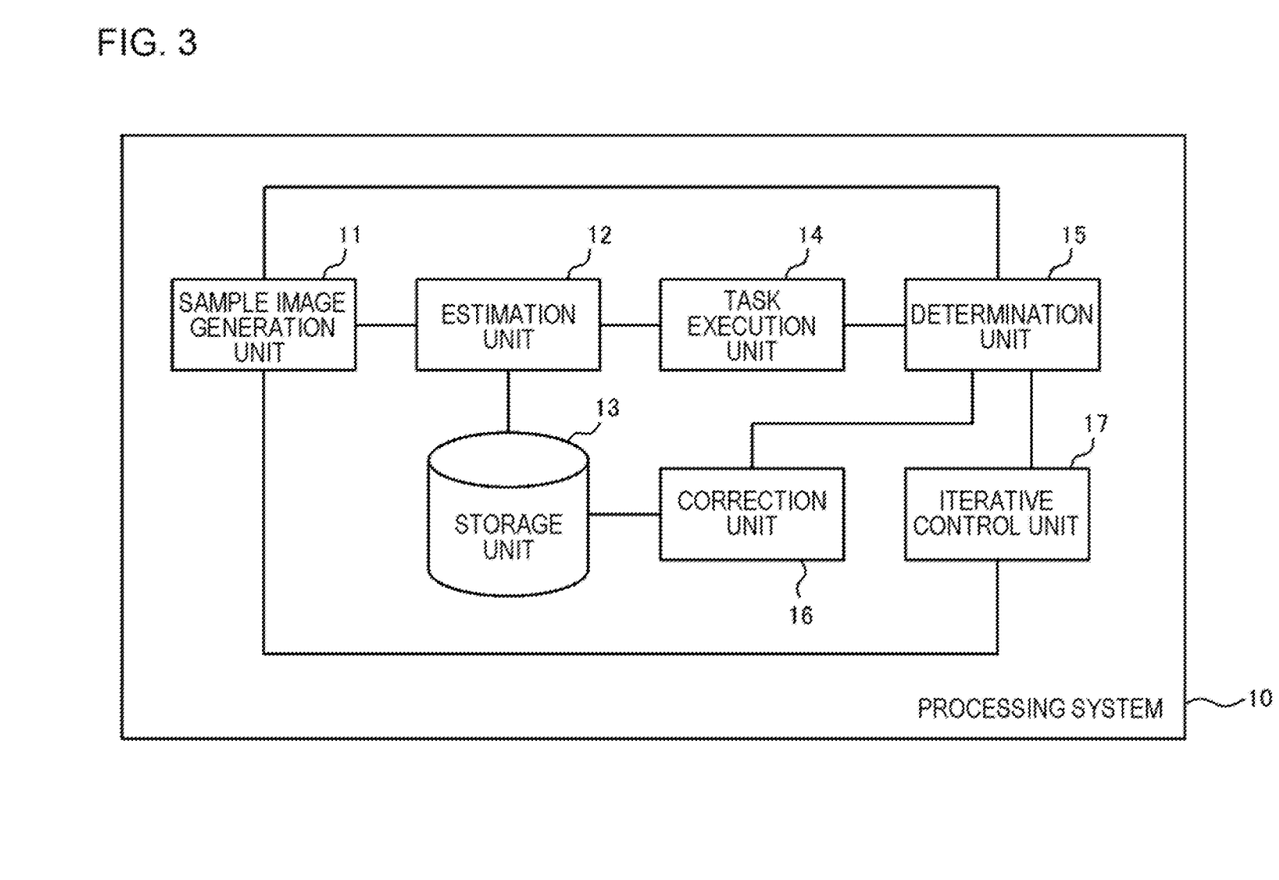
FIG. 3 is one example of a functional block diagram of the processing system according to the present example embodiment.
Figure 4:
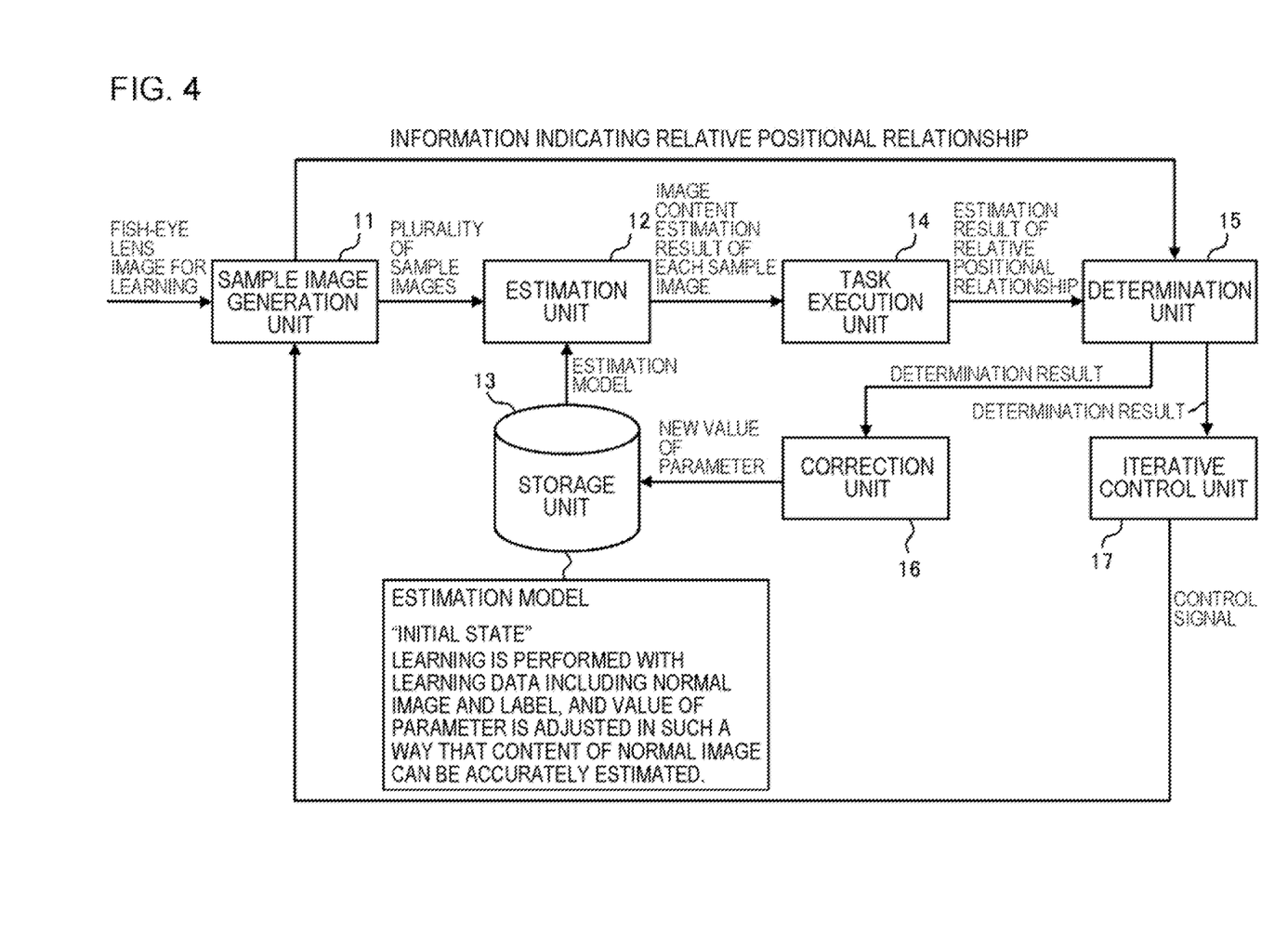
FIG. 4 is a diagram illustrating one example of a flow of data in the processing system according to the present example embodiment.

Next, a functional configuration of the processing system is described. FIG. 3 illustrates one example of a functional block diagram of a processing system 10. FIG. 4 illustrates one example of a flow of data in the processing system 10. As illustrated, the processing system 10 includes a sample image generation unit 11, an estimation unit 12, a storage unit 13, a task execution unit 14, a determination unit 15, a correction unit 16, and an iterative control unit 17. Note that, the processing system 10 may not include the storage unit 13. In this case, an external apparatus configured communicably with the processing system 10 includes the storage unit 13.

The sample image generation unit 11 generates, from a fish-eye lens image (first image) for learning generated by capture using a fish-eye lens (first lens), a plurality of sample images being each associated with a partial region of the fish-eye lens image for learning. The fish-eye lens image is what is called an omnidirectional image, a spherical image, a full circumferential image, a 360° image, or the like.

The sample image generation unit 11 extracts, as a sample image, a partial region in a panoramic image for learning resulting from plane development of a fish-eye lens image for learning. The sample image generation unit 11 may perform plane development of the whole fish-eye lens image for learning, and then cut out a sample image from a panoramic image for learning acquired by the plane development. Alternatively, the sample image generation unit 11 may cut out a part from a fish-eye lens image for learning, and generate a sample image by performing plane development of the cut-out part. In either case, a partial region in a panoramic image for learning resulting from plane development of a fish-eye lens image for learning can be extracted as a sample image. Note that, since a method for performing plane development of a fish-eye lens image is widely known, description thereof herein is omitted.

In the present example embodiment, the sample image generation unit 11 can cut out, as a sample image, each of a plurality of partial regions adjacent to one another in a panoramic image for learning. A plurality of sample images are preferably adjacent to one another with no space, but may be adjacent with a slight space in between. Note that, a position, size, a number, and the like for cutting out a sample image can be designed according to a content of a task to be executed by the task execution unit 14.

The sample image generation unit 11 passes the generated sample image to the estimation unit 12, as illustrated in FIG. 4. Moreover, the sample image generation unit 11 passes, to the determination unit 15, information indicating a relative positional relationship of a plurality of sample images in the fish-eye lens image for learning (panoramic image for learning). The relative positional relationship of a plurality of sample images indicates a horizontal arrangement order of a plurality of horizontally adjacent sample images, a vertical arrangement order of a plurality of vertically adjacent sample images, or the like. In the present example embodiment, although it is assumed that the sample image generation unit 11 cuts out three horizontally adjacent sample images, and passes, to the determination unit 15, information indicating an arrangement order of the three sample images, the present invention is not limited thereto.

The storage unit 13 stores an estimation model. The estimation model is, but not limited to, for example, a convolutional neural network (CNN). In the estimation model, machine learning using learning data including a second image generated by capture using a second lens and a label indicating a content of the second image is already executed, and a value of a parameter is adjusted in such a way that the content of the second image can be accurately estimated.

A characteristic of the second lens differs from a characteristic of a fish-eye lens. A characteristic differing between the second lens and the fish-eye lens may influence a feature of a subject appearing in an image (i.e., a feature of a subject appearing in an image may also differ when a characteristic differs), and, for example, a field angle, a focal length, and the like are exemplified.

In the present example embodiment, the first lens is a fish-eye lens, and the second lens is a standard lens. In other words, in an estimation model stored in the storage unit 13, machine learning using learning data including a normal image generated by capture using the standard lens and a label indicating a content of the normal image is already executed, and a value of a parameter is adjusted in such a way that the content of the normal image can be accurately estimated. Note that, the second lens may be a lens differing from a fish-eye lens, and may be a lens other than a standard lens.

The estimation unit 12 inputs a sample image into an estimation model stored in the storage unit 13, and generates an image content estimation result indicating a content for each sample image. The image content estimation result indicates an object, a place, a scene, a situation, and the like indicated by the sample image. Note that, as described above, in an initial state, a value of a parameter of the estimation model is adjusted in such a way that a content of a normal image can be accurately estimated. Thus, a possibility that a content of a sample image indicated by an image content estimation result is "incorrect" becomes high in a state before a correction of a value of a parameter by the correction unit 16 is performed, and in a state where a correction of a value of a parameter by the correction unit 16 is insufficient.

As illustrated in FIG. 4, the estimation unit 12 passes, to the task execution unit 14, an image content estimation result of each of a plurality of the generated sample images.

The task execution unit 14 executes a predetermined task, based on an image content estimation result of each of the sample images. In the present example embodiment, the task execution unit 14 estimates a relative positional relationship of a plurality of sample images in a fish-eye lens image for learning (panoramic image for learning). More specifically, in a case of the present example embodiment in which the sample image generation unit 11 cuts out three horizontally adjacent sample images, the task execution unit 14 estimates a horizontal arrangement order of the three sample images.

For example, the task execution unit 14 may acquire an image content estimation result of each of the sample images by inputting an image content estimation result of each of the sample images into an estimation model for estimating a relative positional relationship of a plurality of images, based on an image content estimation result of each of a plurality of the images.

As illustrated in FIG. 4, the task execution unit 14 passes, to the determination unit 15, an estimation result of the relative positional relationship of a plurality of the sample images. An estimation result that the task execution unit 14 passes to the determination unit 15 may be an estimation result indicating a relative positional relationship of a plurality of sample images, and may be, for example, an arrangement order of a plurality of sample images, identification information of a sample image estimated to be at a predetermined arrangement position among three sample images (example: a middle of three sample images), or the like.

The determination unit 15 determines whether the estimation result of the relative positional relationship by the task execution unit 14 is correct, based on information (right answer information) indicating the relative positional relationship of a plurality of the sample images acquired from the sample image generation unit 11, and an estimation result of the relative positional relationship of a plurality of the sample images acquired from the task execution unit 14.

The iterative control unit 17 iteratively executes the above-described processing by the sample image generation unit 11, the estimation unit 12, the task execution unit 14, the determination unit 15, and the correction unit 16 until an estimation result of a relative positional relationship of a plurality of sample images satisfies an end condition.

The end condition is, but not limited to, "an estimation result of a relative positional relationship of a plurality of sample images is determined to be correct", "the total number of times that an estimation result of a relative positional relationship of a plurality of sample images is determined to be correct has reached a threshold value", "estimation results of a relative positional relationship of a plurality of sample images have been determined to be correct a predetermined number of times in a row", or the like.

When an estimation result of a relative positional relationship of a plurality of sample images is determined to be incorrect, the correction unit 16 corrects a value of a parameter of the estimation model stored in the storage unit 13 (updates a value of a parameter to a new value). For example, the correction unit 16 can correct a weight of a plurality of layers of an estimation model by a stochastic gradient descent method. Note that, exemplification herein is only one example, and an estimation model may be updated by another method.

Figure 5:
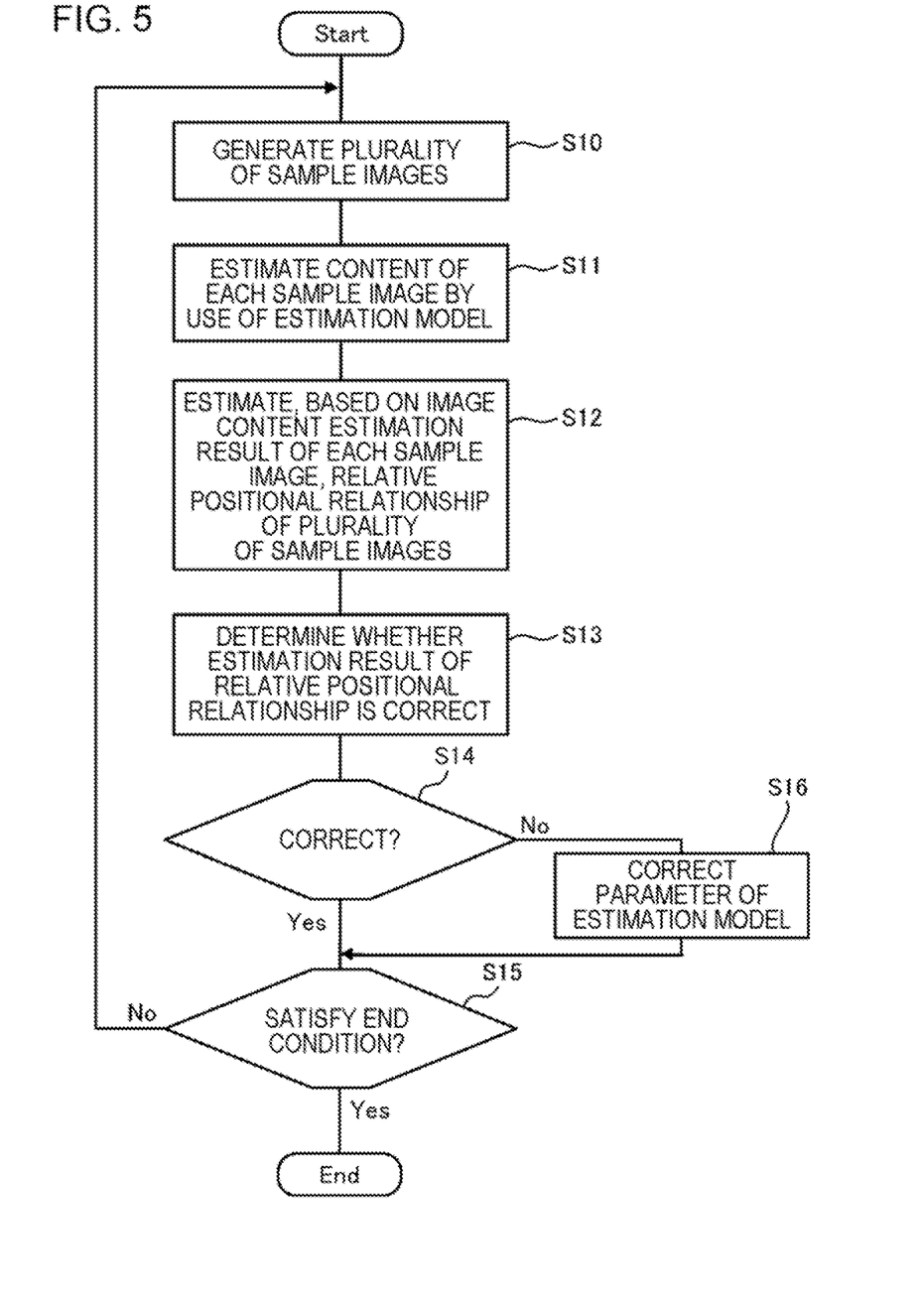
FIG. 5 is a flowchart illustrating one example of a flow of processing in the processing system according to the present example embodiment.

Next, one example of a flow of processing in the processing system 10 is described by use of a flowchart in FIG. 5. Note that, since details of processing performed by each functional unit in each step have been described above, description thereof herein is omitted.

In S10, the sample image generation unit 11 generates, from a fish-eye lens image for learning generated by capture using a fish-eye lens, a plurality of sample images being each associated with a partial region of the fish-eye lens image for learning. For example, the sample image generation unit 11 cuts out three regions adjacent to one another in a panoramic image for learning resulting from plane development of the fish-eye lens image for learning, and sets the regions as three sample images.

In S11, the estimation unit 12 inputs a sample image into an estimation model stored in the storage unit 13, and thereby generates an image content estimation result indicating a content for each sample image.

In S12, the task execution unit 14 estimates, based on the image content estimation result for each of the sample images, a relative positional relationship of a plurality of the sample images in a fish-eye lens image for learning (panoramic image for learning).

In S13, the determination unit 15 determines whether the estimation result of the relative positional relationship of a plurality of the sample images generated in S12 is correct.

When the estimation result is incorrect (No in S14), the correction unit 16 corrects a value of a parameter of the estimation model stored in the storage unit 13 by re-execution of machine learning (S16).

When the estimation result is correct (Yes in S14), and after S16, the flow advances to S15. In S15, whether the estimation result of the relative positional relationship of a plurality of the sample images generated in S12 satisfies an end condition is determined. When the estimation result does not satisfy the end condition (No in S15), the flow returns to S10, and iterates processing. When the estimation result satisfies the end condition (Yes in S15), the flow ends the processing.

The processing system 10 according to the present example embodiment described above corrects a value of a parameter of an estimation model adjusted in such a way that a content of a normal image generated by capture using a standard lens can be accurately estimated, based on a result of a predetermined task using a panoramic image resulting from plane development of a fish-eye lens image generated by capture using a fish-eye lens, and the estimation model, and can thereby adjust a value of a parameter of the estimation model in such a way that a content of the panoramic image resulting from plane development of the fish-eye lens image can be accurately estimated.

Such a processing system 10 according to the present example embodiment described above can generate an estimation model that can accurately estimate a content of a panoramic image resulting from plane development of a fish-eye lens image, without preparing a large amount of learning data including a panoramic image resulting from plane development of a fish-eye lens image and a label indicating a content of the panoramic image.

Moreover, the processing system 10 according to the present example embodiment can acquire a satisfactory convergence characteristic by correcting a value of a parameter of an estimation model, based on a stochastic gradient descent method.

Second Example Embodiment

A processing system 10 according to the present example embodiment applies, by transfer learning using learning data including a fish-eye lens image for transfer learning and a label indicating a content of the fish-eye lens image for transfer learning, an estimation model in which a value of a parameter is adjusted in such a way that a content of a panoramic image resulting from plane development of the fish-eye lens image can be accurately estimated, to a region for estimating a content of the fish-eye lens image.

Figure 6:
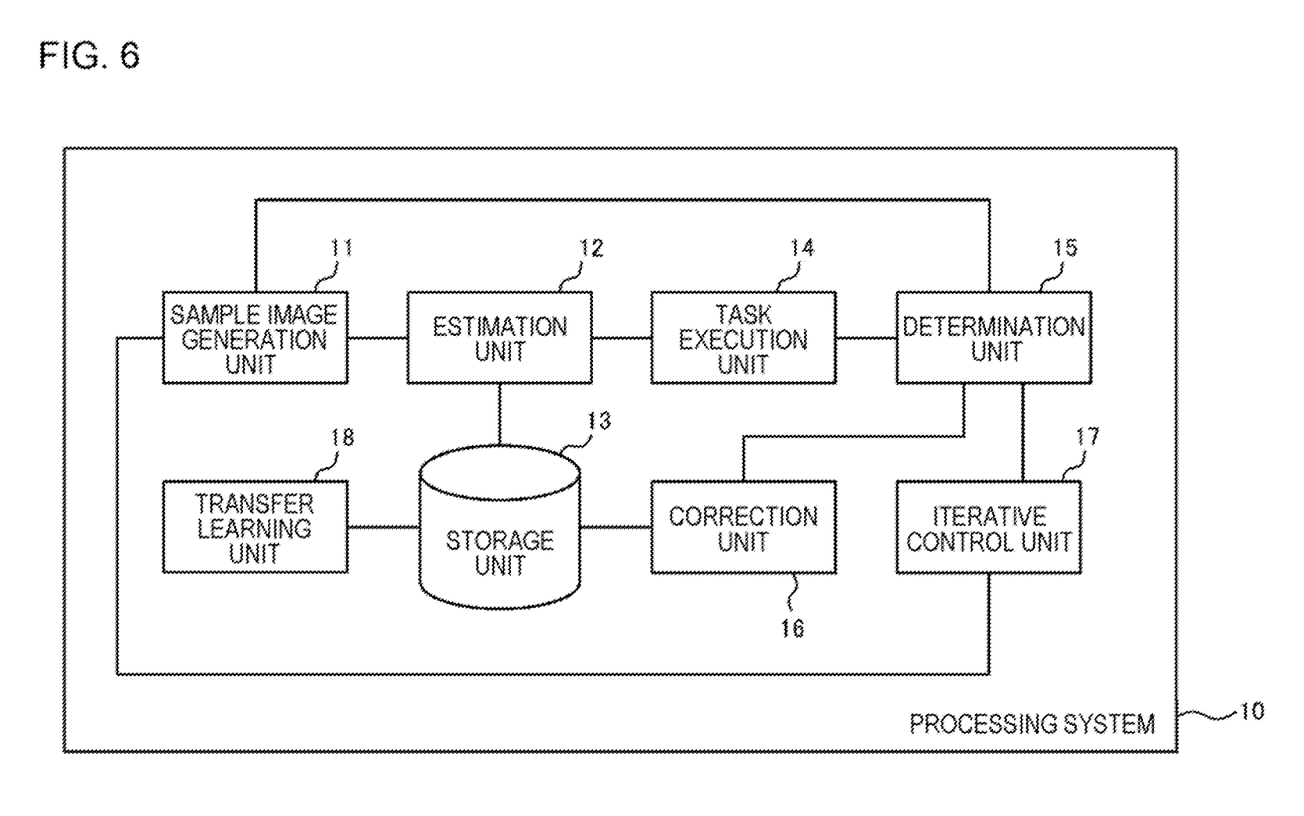
FIG. 6 is one example of a functional block diagram of the processing system according to the present example embodiment.

FIG. 6 illustrates one example of a functional block diagram of the processing system 10. As illustrated, the processing system 10 includes a sample image generation unit 11, an estimation unit 12, a storage unit 13, a task execution unit 14, a determination unit 15, a correction unit 16, an iterative control unit 17, and a transfer learning unit 18. Configurations of the sample image generation unit 11, the estimation unit 12, the storage unit 13, the task execution unit 14, the determination unit 15, the correction unit 16, and the iterative control unit 17 are similar to those according to the first example embodiment.

Figure 7:
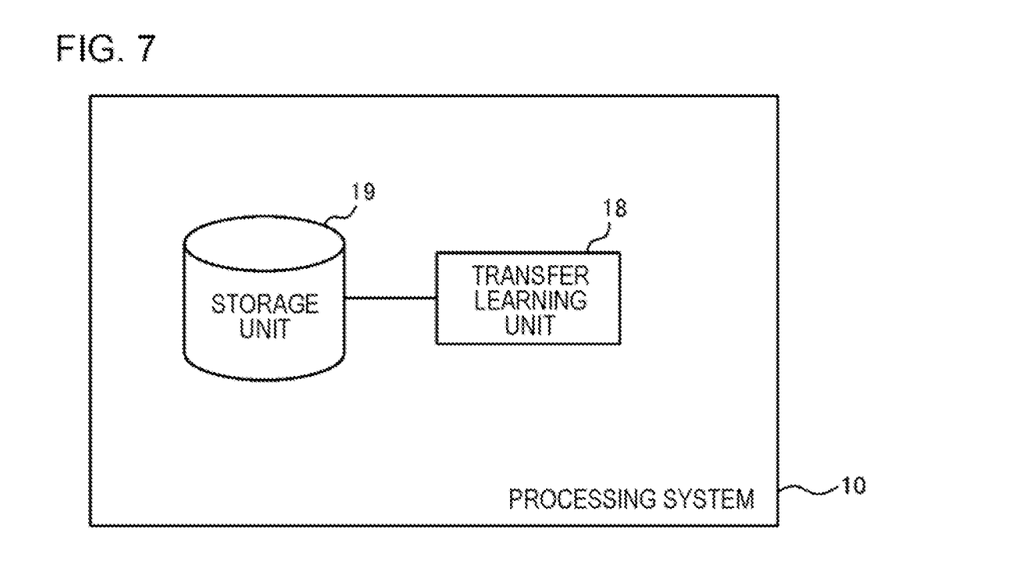
FIG. 7 is one example of a functional block diagram of the processing system according to the present example embodiment.

FIG. 7 illustrates another example of a functional block diagram of the processing system 10. As illustrated, the processing system 10 includes the transfer learning unit 18 and a storage unit 19.

The storage unit 13 and the storage unit 19 each store an estimation model in which a value of a parameter adjusted in such a way that a content of a panoramic image resulting from plane development of a fish-eye lens image can be accurately estimated. The estimation model may be an estimation model generated by a method described in the first example embodiment. Otherwise, the estimation model may be an estimation model generated by performing machine learning of learning data including a panoramic image resulting from plane development of a fish-eye lens image and a label indicating a content of the panoramic image. The estimation model is, but not limited to, for example, a CNN.

The transfer learning unit 18 applies, by transfer learning using learning data including a fish-eye lens image for transfer learning and a label indicating a content of the fish-eye lens image for transfer learning, an estimation model in which a value of a parameter is adjusted in such a way that a content of a panoramic image resulting from plane development of the fish-eye lens image can be accurately estimated, to a region for estimating a content of the fish-eye lens image. The transfer learning unit 18 can adopt any method for transfer learning.

One example of a hardware configuration of the processing system 10 is similar to that according to the first example embodiment.

Hence, the processing system 10 according to the present example embodiment can generate an estimation model that can accurately estimate a content of a fish-eye lens image, by utilizing transfer learning, without preparing a large amount of learning data including a fish-eye lens image and a label indicating a content of the fish-eye lens image.

Third Example Embodiment

Figure 8:
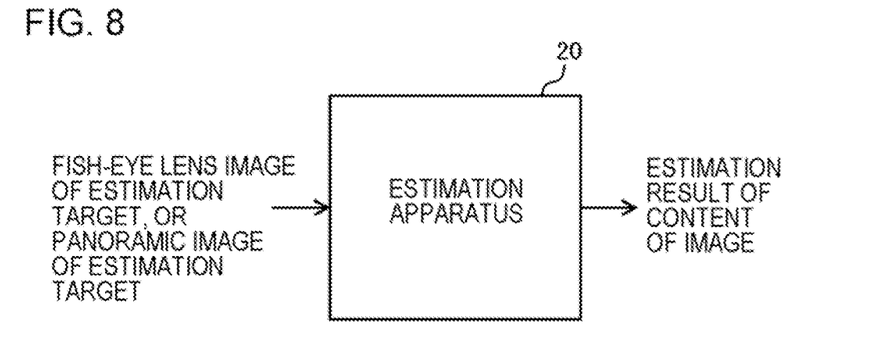
FIG. 8 is a diagram for describing a configuration of the estimation apparatus according to the present example embodiment.

As illustrated in FIG. 8, an estimation apparatus 20 according to the present example embodiment estimates a content of a fish-eye lens image of an estimation target or a panoramic image (an image resulting from plane development of a fish-eye lens image) of an estimation target, by inputting the fish-eye lens image of the estimation target or the panoramic image of the estimation target into an estimation model generated by the processing system 10 according to the first or second example embodiment. One example of a hardware configuration of the estimation apparatus 20 is illustrated in FIG. 2, similarly to the processing system 10.

Figure 9:
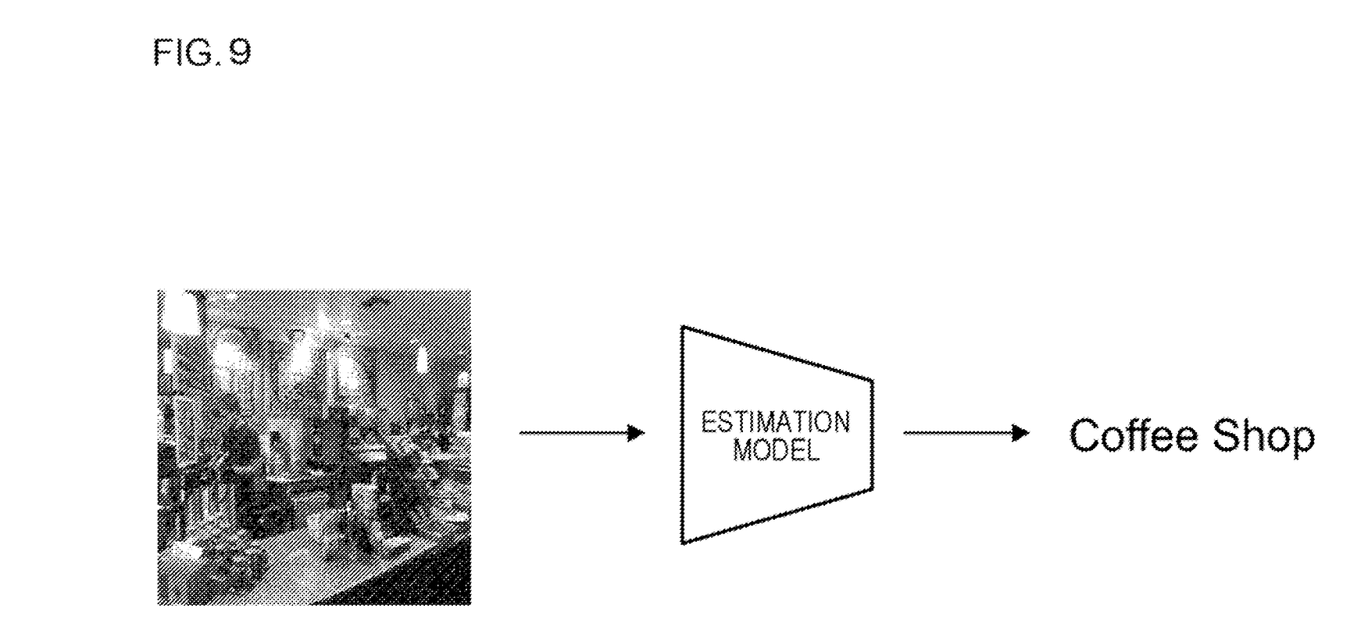
FIG. 9 is a diagram illustrating one example of an image estimated by the estimation apparatus according to the present example embodiment.
Figure 10:
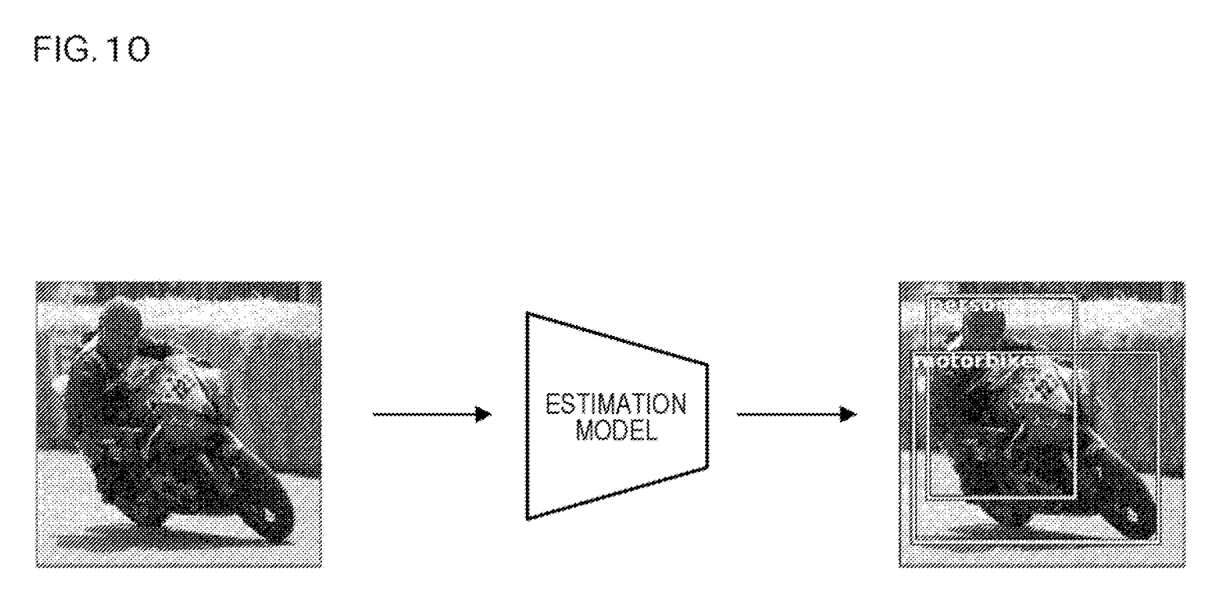
FIG. 10 is a diagram illustrating one example of an image estimated by the estimation apparatus according to the present example embodiment.

Hence, the estimation apparatus 20 according to the present example embodiment allows a content of a panoramic image resulting from plane development of a fish-eye lens image to be accurately estimated, without preparing a large amount of learning data including a panoramic image resulting from plane development of a fish-eye lens image and a label indicating a content of the panoramic image. The estimation apparatus 20 can perform recognition of a scene, recognition of an object, and the like. For example, the estimation apparatus 20 can recognize a scene such as a coffee shop from an image as illustrated in FIG. 9, or recognize an object such as a motorbike or a person from an image as illustrated in FIG. 10.

Moreover, the estimation apparatus 20 according to the present example embodiment allows a content of a fish-eye lens image to be accurately estimated, without preparing a large amount of learning data including a fish-eye lens image and a label indicating a content of the fish-eye lens image.

Modification Example

Herein, a modification example is described. The first to third example embodiments each describe an example in which "a first lens is a fish-eye lens", "a second lens is a standard lens", and a processing system 10 "adjusts a value of a parameter of an estimation model adjusted in such a way that a content of a normal image generated by capture using a standard lens can be accurately estimated, in such a way that a content of a fish-eye lens image generated by capture using a fish-eye lens can be accurately estimated".

However, the present invention is not limited thereto. For example, "a first lens is a wide-angle lens that is not classified into a fish-eye lens", "a second lens is a standard lens", and the processing system 10 may "adjust a value of a parameter of an estimation model adjusted in such a way that a content of a normal image generated by capture using the standard lens can be accurately estimated, in such a way that a content of an image generated by capture using the wide-angle lens that is not classified into a fish-eye lens can be accurately estimated".

Otherwise, "a first lens is a fish-eye lens", "a second lens is a wide-angle lens that is not classified into a fish-eye lens", and the processing system 10 may "adjust a value of a parameter of an estimation model adjusted in such a way that a content of an image generated by capture using the wide-angle lens that is not classified into a fish-eye lens can be accurately estimated, in such a way that a content of a fish-eye lens image generated by capture using the fish-eye lens can be accurately estimated".

Otherwise, "a first lens is a wide-angle lens that is not classified into a fish-eye lens", "a second lens is a fish-eye lens", and the processing system 10 may "adjust a value of a parameter of an estimation model adjusted in such a way that a content of a fish-eye lens image generated by capture using the fish-eye lens can be accurately estimated, in such a way that a content of an image generated by capture using the wide-angle lens that is not classified into a fish-eye lens can be accurately estimated".

Moreover, in each of the examples described in the first to third example embodiments, a task execution unit 14 executes a task of estimating a relative positional relationship of a plurality of sample images. However, a task executed by the task execution unit 14 is not limited to the above-described example, and may be a task in which it becomes easy for a result of the task to satisfy a predetermined condition when an image content estimation result for a sample image generated by an estimation unit 12 is correct, and it becomes difficult for a result of the task to satisfy the predetermined condition when an image content estimation result for a sample image generated by the estimation unit 12 is not correct.

While the invention of the present application has been described above with reference to the example embodiments (and examples), the invention of the present application is not limited to the example embodiments (and examples) described above. Various modifications understandable to a person skilled in the art can be made to a configuration and details of the invention of the present application within the scope of the invention of the present application.

Some or all of the above-described example embodiments can also be described as, but not limited to, the following supplementary notes.

1. A processing system including:
    a sample image generation means for generating, from a first image for learning generated by capture using a first lens, a plurality of sample images being each associated with a partial region of the first image for learning;
    an estimation means for inputting the sample image into an estimation model generated by machine learning using learning data including a second image generated by capture using a second lens differing in characteristic from the first lens and a label indicating a content of the second image, and generating an image content estimation result indicating a content for each of the sample images;
    a task execution means for estimating, based on the image content estimation result for each of the sample images, a relative positional relationship of a plurality of the sample images in the first image for learning;
    a determination means for determining whether an estimation result of the relative positional relationship is correct; and
    a correction means for correcting a value of a parameter of the estimation model when an estimation result of the relative positional relationship is determined to be incorrect.

2. The processing system according to supplementary note 1, wherein
    the correction means corrects a value of a parameter of the estimation model, based on a stochastic gradient descent method.

3. The processing system according to supplementary note 1 or 2, further including
    an iterative control means for iteratively executing processing by the sample image generation means, the estimation means, the task execution means, the determination means, and the correction means until an estimation result of the relative positional relationship satisfies an end condition.

4. The processing system according to any one of supplementary notes 1 to 3, wherein
    the first lens is a fish-eye lens, and the second lens is a lens differing from a fish-eye lens.

5. The processing system according to supplementary note 4, wherein
    the sample image generation means extracts, as the sample image, a partial region in a panoramic image for learning resulting from plane development of the first image for learning generated by capture using a fish-eye lens.

6. The processing system according to supplementary note 5, further including
    a transfer learning means for applying, by transfer learning using learning data including a fish-eye lens image for transfer learning generated by capture using a fish-eye lens and a label indicating a content of the fish-eye lens image for transfer learning, the estimation model for estimating a content of the panoramic image, to a region for estimating a content of the fish-eye lens image.

7. A processing system including
    a transfer learning means for applying, by transfer learning using learning data including a fish-eye lens image generated by capture using a fish-eye lens and a label indicating a content of the fish-eye lens image, an estimation model for estimating a content of a panoramic image resulting from plane development of the fish-eye lens image, to a region for estimating a content of the fish-eye lens image.

8. An estimation apparatus that estimates a content of an image of an estimation target generated by capture using a first lens, or an image resulting from plane development of the image of the estimation target, by use of an estimation model in which a value of a parameter is adjusted by a processing system including
 a sample image generation means for generating, from a first image for learning generated by capture using the first lens, a plurality of sample images being each associated with a partial region of the first image for learning,
 an estimation means for inputting the sample image into the estimation model generated by machine learning using learning data including a second image generated by capture using a second lens differing in characteristic from the first lens and a label indicating a content of the second image, and generating an image content estimation result indicating a content for each of the sample images,
 a task execution means for estimating, based on the image content estimation result for each of the sample images, a relative positional relationship of a plurality of the sample images in the first image for learning,
 a determination means for determining whether an estimation result of the relative positional relationship is correct, and
 a correction means for correcting a value of a parameter of the estimation model when an estimation result of the relative positional relationship is determined to be incorrect.

9. A processing method including:
 by a computer,
 generating, from a first image for learning generated by capture using a first lens, a plurality of sample images being each associated with a partial region of the first image for learning;
 inputting the sample image into an estimation model generated by machine learning using learning data including a second image generated by capture using a second lens differing in characteristic from the first lens and a label indicating a content of the second image, and generating an image content estimation result indicating a content for each of the sample images;
 estimating, based on the image content estimation result for each of the sample images, a relative positional relationship of a plurality of the sample images in the first image for learning;
 determining whether an estimation result of the relative positional relationship is correct; and
 correcting a value of a parameter of the estimation model when an estimation result of the relative positional relationship is determined to be incorrect.

10. A program that causes a computer to function as:
 a sample image generation means for generating, from a first image for learning generated by capture using a first lens, a plurality of sample images being each associated with a partial region of the first image for learning;
 an estimation means for inputting the sample image into an estimation model generated by machine learning using learning data including a second image generated by capture using a second lens differing in characteristic from the first lens and a label indicating a content of the second image, and generating an image content estimation result indicating a content for each of the sample images;
 a task execution means for estimating, based on the image content estimation result for each of the sample images, a relative positional relationship of a plurality of the sample images in the first image for learning;
 a determination means for determining whether an estimation result of the relative positional relationship is correct; and
 a correction means for correcting a value of a parameter of the estimation model when an estimation result of the relative positional relationship is determined to be incorrect.

What is claimed is:

1. A processing system comprising:
 at least one memory configured to store one or more instructions; and
 at least one processor configured to execute the one or more instructions to:
 generate, from a first image for learning generated by capture using a first lens, a plurality of sample images being each associated with a partial region of the first image for learning;
 input the sample image into an estimation model generated by machine learning using learning data including a second image generated by capture using a second lens differing in characteristic from the first lens and a label indicating a content of the second image, and generate an image content estimation result indicating a content for each of the sample images;
 estimate, based on the image content estimation result for each of the sample images, a relative positional relationship of a plurality of the sample images in the first image for learning;
 determine whether an estimation result of the relative positional relationship is correct; and
 correct a value of a parameter of the estimation model when an estimation result of the relative positional relationship is determined to be incorrect.

2. The processing system according to claim 1, wherein the processor is further configured to execute the one or more instructions to correct a value of a parameter of the estimation model, based on a stochastic gradient descent method.

3. The processing system according to claim 1, wherein the processor is further configured to execute the one or more instructions to iteratively execute the generating a plurality of sample images; the inputting the sample image into the estimation model, the generating the image content estimation result, the estimating the relative positional relationship of a plurality of the sample images, the determining whether the estimation result of the relative positional relationship is correct, and correcting the value of the parameter of the estimation model, until the estimation result of the relative positional relationship satisfies an end condition.

4. The processing system according to claim 1, wherein the first lens is a fish-eye lens, and the second lens is a lens differing from a fish-eye lens.

5. The processing system according to claim 4, wherein the processor is further configured to execute the one or more instructions to extract, as the sample image, a partial region in a panoramic image for learning resulting from plane development of the first image for learning generated by capture using a fish-eye lens.

6. The processing system according to claim 5,
wherein the processor is further configured to execute the one or more instructions to apply, by transfer learning using learning data including a fish-eye lens image for transfer learning generated by capture using a fish-eye lens and a label indicating a content of the fish-eye lens image for transfer learning, the estimation model for estimating a content of the panoramic image, to a region for estimating a content of the fish-eye lens image.

7. A processing method executed by a computer, the method comprising:
generating, from a first image for learning generated by capture using a first lens, a plurality of sample images being each associated with a partial region of the first image for learning;
inputting the sample image into an estimation model generated by machine learning using learning data including a second image generated by capture using a second lens differing in characteristic from the first lens and a label indicating a content of the second image, and generating an image content estimation result indicating a content for each of the sample images;
estimating, based on the image content estimation result for each of the sample images, a relative positional relationship of a plurality of the sample images in the first image for learning;
determining whether an estimation result of the relative positional relationship is correct; and
correcting a value of a parameter of the estimation model when an estimation result of the relative positional relationship is determined to be incorrect.

8. A non-transitory storage medium storing a program that causes a computer to:
generate, from a first image for learning generated by capture using a first lens, a plurality of sample images being each associated with a partial region of the first image for learning;
input the sample image into an estimation model generated by machine learning using learning data including a second image generated by capture using a second lens differing in characteristic from the first lens and a label indicating a content of the second image, and generate an image content estimation result indicating a content for each of the sample images;
estimate, based on the image content estimation result for each of the sample images, a relative positional relationship of a plurality of the sample images in the first image for learning;
determine whether an estimation result of the relative positional relationship is correct; and
correct a value of a parameter of the estimation model when an estimation result of the relative positional relationship is determined to be incorrect.

* * * * *